United States Patent
Lee

(10) Patent No.: US 10,305,302 B2
(45) Date of Patent: May 28, 2019

(54) APPARATUS FOR CONTROLLING POWER MODE OF BATTERY PACK

(71) Applicant: SAMSUNG SDI CO., LTD., Yongin-si, Gyeonggi-do (KR)

(72) Inventor: Sang Gu Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 55 days.

(21) Appl. No.: 15/391,326

(22) Filed: Dec. 27, 2016

(65) Prior Publication Data

US 2017/0187208 A1     Jun. 29, 2017

(30) Foreign Application Priority Data

Dec. 28, 2015   (KR) .................. 10-2015-0187481

(51) Int. Cl.
   *H02J 7/00*   (2006.01)
(52) U.S. Cl.
   CPC .......... *H02J 7/0034* (2013.01); *H02J 7/0045* (2013.01); *H02J 7/0047* (2013.01); *H02J 7/0068* (2013.01); *H02J 2007/005* (2013.01)
(58) Field of Classification Search
   CPC ...... H02J 7/0034; H02J 7/0045; H02J 7/0047; H02J 7/0068; H02J 2007/005

USPC ......................................................... 320/134
See application file for complete search history.

(56) References Cited

U.S. PATENT DOCUMENTS

| 2006/0038550 | A1  | 2/2006  | Nazarian |
| 2009/0271644 | A1* | 10/2009 | Fiebrich ................. G06F 1/266 713/320 |
| 2011/0163723 | A1* | 7/2011  | Tan ....................... H02J 7/0029 320/134 |
| 2015/0153811 | A1  | 6/2015  | Tran et al. |
| 2016/0099821 | A1* | 4/2016  | Streit .................... H04L 25/085 375/257 |

FOREIGN PATENT DOCUMENTS

KR    10-2013-0104149 A    9/2013

* cited by examiner

*Primary Examiner* — Nathaniel R Pelton
(74) *Attorney, Agent, or Firm* — Lee & Morse, P.C.

(57) ABSTRACT

An apparatus for controlling a power mode of a battery pack includes an LED switch circuit and a mode controller. The LED switch circuit outputs a signal when the LED switch circuit is controlled to be on based on a user input. The mode controller controls a power mode of the battery pack to be in a shut-down mode or a wake-up mode based on the signal from the LED switch circuit.

13 Claims, 3 Drawing Sheets though one or more intermediate elements. In addition, other expressions that explain the relationship between elements, such as "between," "directly between," "adjacent," or "directly adjacent," should be construed in the same way.

APPARATUS FOR CONTROLLING POWER MODE OF BATTERY PACK

CROSS-REFERENCE TO RELATED APPLICATION

Korean Patent Application No. 10-2015-0187481, filed on Dec. 28, 2015, and entitled, "Apparatus for Controlling Power Mode of Battery Pack," is incorporated by reference herein in its entirety.

BACKGROUND

1. Field

One or more embodiments described herein relate to an apparatus for controlling a power mode of a battery pack.

2. Description of the Related Art

A battery pack may include an apparatus (e.g., a power supply device) for controlling on/off states of the battery pack. Such an apparatus may control a power module to operate the battery pack in shut-down mode (e.g., a power-down mode or an inactive mode) in order to prevent the battery pack from being over-discharged.

In order to release the shut-down mode, an external power supply source (e.g., a charger) connected to the apparatus may be used. However, there may be a case where a user may want to release the shut-down mode without connecting the charger or otherwise at his convenience.

One type of battery pack includes an LED switch (S/W). This battery pack displays information relating to the residual capacity of a battery or the current state of the battery pack using brightness or color of an LED of the LED switch.

SUMMARY

In accordance with one or more embodiments, an apparatus for controlling a power mode of a battery pack including an LED switch circuit to output a signal when the LED switch circuit is controlled to be on based on a user input; and a mode controller to control a power mode of the battery pack to be in a shut-down mode or a wake-up mode based on the signal from the LED switch circuit.

The mode controller may control the power mode of the battery pack when the signal is received for a predetermined time. The mode controller may include a first external connection terminal and a second external connection terminal which are directly connected to an external device; and an internal connection terminal connected to an electronic device operated by the battery pack, wherein the battery pack is controlled to be in the wake-up mode when a predetermined signal flows into the internal connection terminal.

The mode controller may include a first switch connected to the LED switch circuit and the first external connection terminal, the first switch to be controlled to be on based on the signal from the LED switch circuit and to output a first signal; a second switch connected to the first switch and controlled to output a second signal when controlled to be on based on the first signal; and a third switch connected to the second switch and controlled to output a third signal to the internal connection terminal when controlled to be on based on the first signal.

The first switch may be a PNP transistor may include an emitter, a collector, and a base, the emitter connected to the first external connection terminal and the base connected to the LED switch circuit, the first switch to output the first signal through the collector when the signal is received from the LED switch circuit through the base.

The second switch may be an NPN transistor including an emitter, a collector, and a base, the collector connected to supplied power and the base connected to the collector of the first switch, the second switch to output the second signal through the emitter when the first signal is received from the first switch through the base. The second signal may be an inactive signal to control the power mode of the battery pack to be the shut-down mode.

The third switch may be an N-channel MOSFET including a drain connected to the second external connection terminal, a gate connected to the collector of the first switch, and a source connected to the internal connection terminal, the third switch to output the third signal through the source when the first signal is received from the gate. The third signal may be an inactive signal to control the power mode of the battery pack to be the wake-up mode.

The apparatus may include a rectification diode connected between the second external connection terminal and the third switch, the rectification diode to prevent a current, which flows from the second external connection terminal to the third switch, from flowing backward. The apparatus may include a control circuit connected between the first switch and the third switch, wherein the control circuit includes one or more resistive elements to prevent the first current from flowing to the internal connection terminal when the battery pack is in the wake-up mode.

BRIEF DESCRIPTION OF THE DRAWINGS'

Features will become apparent to those of skill in the art by describing in detail exemplary embodiments with reference to the attached drawings in which.

DETAILED DESCRIPTION

Figure 1:
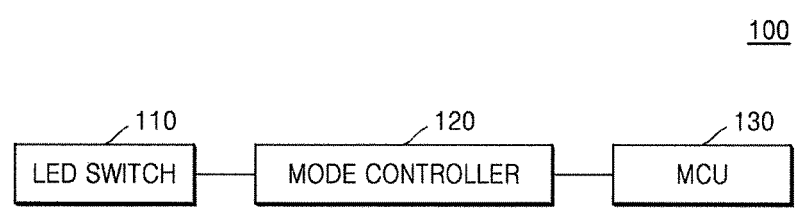
FIG. 1 illustrates an embodiment of an apparatus for controlling the power mode of a battery pack.

Example embodiments will now be described with reference to the drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

FIG. 1 illustrates an embodiment of an apparatus 100 for controlling the power mode of a battery pack. Referring to FIG. 1, the apparatus 100 includes an LED switch 110, a mode controller 120, and a Micro Control Unit (MCU) 130. The LED switch 110 includes one or more switches for receiving a user input. When the LED switch 110 is controlled to be on based on the user input, the LED switch 110 may transmit the generated signal to the mode controller 120.

The mode controller 120 controls the power mode of the battery pack based on the signal input through the LED switch 110. The mode controller 120 may control the power mode of the battery pack by generating a mode control signal based on the signal input through the LED switch 110. The mode control signal may be transmitted to the MCU 130. The battery pack may be operated in a predetermined mode (e.g., a wake-up mode or active mode) or a shut-down mode under control of the mode controller 120. The mode controller 120 may transmit an active signal or an inactive signal to the MCU 130 based on the signal from the LED switch. The MCU 130 may control the battery pack to be operate in wake-up mode when the active signal is received. The MCU 130 may control the battery pack to operate in shut-down mode when the inactive signal is received. The inactive signal may be, for example, an LED signal generated when the LED switch 110 is to be on in wake-up mode. The active signal may be a current signal generated, for example, when the LED switch 110 is to be on in shut-down mode. In one embodiment, the active signal may control supply of an interrupt current to an internal connection terminal B− of the battery pack.

In one embodiment, the mode controller 120 may control the power mode of the battery pack when the input from the LED switch 110 continues for a predetermined time (e.g., a long-press input). In one example, the mode controller 120 may sense that a long-press input has been generated. When the LED switch 110 is on for less than the predetermined time, the mode controller 120 may maintain the power mode of the battery pack in a current state. As a result, the power mode of the battery pack may be controlled according to a control time of the signal received from the LED switch 110.

The MCU 130 controls the battery pack to operate in wake-up mode or shut-down mode according to the mode control signal from the mode controller 120. For example, when the MCU 130 receives an inactive signal from the mode controller 120 during operation of the battery pack in wake-up mode, the MCU 130 switches the power mode to shut-down mode and also enters shut-down mode. In contrast, when a signal enters the internal connection terminal B− during operation of the battery pack in shut-down mode, the MCU 130 recognizes entrance of the signal and enters wake-up mode, and switches the power mode of the battery pack to wake-up mode.

Figure 2:
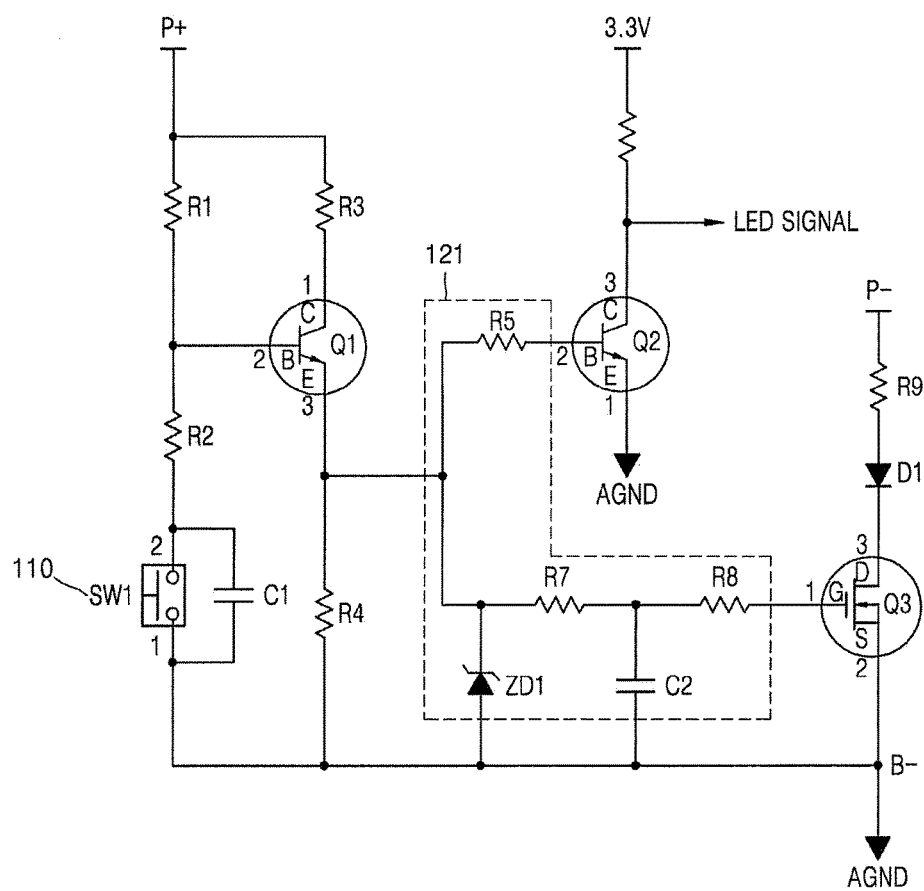
FIG. 2 illustrates an embodiment of an internal circuit of the apparatus.

FIG. 2 illustrates an embodiment of an internal circuit of the apparatus 100 for controlling the power mode of the battery pack. Referring to FIG. 2, the apparatus 100 includes a first external connection terminal P+, a second external connection terminal P− and the internal connection terminal B−. The first external connection terminal P+ and the second external connection terminal P− are terminals directly connected to an external device. These terminals are connected to a charger when the battery pack is charged and are connected to an electronic device (e.g., a portable terminal) operated by the battery pack during discharging.

The battery pack may be operated in shut-down mode or wake-up mode. When a signal enters the internal connection terminal B− from the first external connection terminal P+ and the second external connection terminal P−, the power mode of the battery pack may be switched to wake-up mode. In one type of battery pack which has been proposed, the signal enters the internal connection terminal B− only when the first external connection terminal P+ and the second external connection terminal P− are connected to the charger. As a result, the power mode of the battery pack may be switched from shut-down mode to wake-up mode. In one embodiment, the power mode of the battery pack may be switched from shut-down mode to wake-up mode based on an operation performed by a user, e.g., by artificially or manually making the signal enter the internal connection terminal B− from the first external connection terminal P+ and the second external connection terminal P− through operation of the LED switch.

First, a case where the battery pack is operated in the wake-up mode is assumed. When the LED switch 110 is controlled to be on based on the user input in wake-up mode, a first switch Q1 connected to the LED switch 110 is controlled to be on based on current output from the LED switch 110.

In the exemplary embodiment, the first switch Q1 is a PNP transistor that has an emitter E is connected to the first external connection terminal P+ of the battery pack and a base B is connected to the LED switch 110, as illustrated in FIG. 2. As a result, the first switch Q1 may output current through a collector C when the current is supplied from the LED switch 110 through the base B. In one embodiment, the first switch Q1 may be a predetermined device controlled to be on when current is received from the LED switch 110 and to output current to an external device (a second switch in the present disclosure).

When the first switch Q1 is controlled to be on, the first switch Q1 outputs current to the second switch Q2 connected to the first switch Q1. The second switch Q2 is controlled to be on based on the current from the first switch Q1.

In the exemplary embodiment, the second switch Q2 is an NPN transistor that has a collector C connected to a supply power VCC of 3.3V and a base B connected to the collector C of the first switch Q1. The second switch Q2 may be controlled to be on and output a current through the emitter E based on current output from the first switch Q1. In one embodiment, the second switch Q2 may be a predetermined switch device controlled to be on based on current from the first switch Q1, when controlled to be on, in the same manner as the first switch Q1. In the present embodiment, the power supply VCC to the collector C of the second switch Q2 is 3.3 V, but may be a different voltage in another embodiment, for example, based on one or more parameters of the circuit.

When the second switch Q2 is controlled to be on, current from the second switch Q2, which is generated based on the supplied power VCC, is transmitted to the MCU 130. The current output from the second switch Q2 is the inactive signal and may be the LED signal.

When an inactive signal is received from the second switch Q2, the MCU 130 controls the power mode of the battery pack to transition from wake-up mode to shut-down mode based on the inactive signal. When the battery pack enters shut-down mode, the MCU 130 may also enter the shut-down mode. A power supply of a CFER/DFET configuring the battery pack including the MCU 130 is turned off, and an Analog Front End (AFC), configured together or replaced with the MCU 130, may also enter shut-down mode.

In FIG. 2, current is transmitted to a third switch Q3 when the first switch Q1 is controlled to be on. In one embodiment, potentials of the second external connection terminal P− of the apparatus 100 for controlling the power mode and the internal connection terminal B− of the battery pack in wake-up mode of the battery pack may be the same as each other. Thus, operation of the third switch Q3 does not have an influence on the control operation of the battery pack.

A control circuit unit 121 for turning off circuit operation of the battery pack may be connected between the second switch Q2 (e.g., emitter E of the second switch Q2) and the third switch Q3. The control circuit unit 121 may prevent operation of elements, which are irrelevant to control of the power mode, from being influenced when the second switch Q2 is to be turned on. For example, as illustrated in FIG. 2, the control circuit unit 121 may include resistors R5, R7, and R8, Zener diode ZD1, and a capacitor C2 in a series/parallel connection.

The Zener Diode ZD1 may be connected to the third switch Q3 to prevent over voltage applying to Gate-Source of the third switch Q3. The Zener Diode ZD1 may also be configured to apply constant voltage to seventh resistor R7 and second capacitor C2 so that the third switch Q3 keep its delay time steady even if the voltage at the first external connection terminal P+ changes. The seventh resistor R7 and the second capacitor C2 form RC circuit, the RC circuit is configured to integrate ON time of the LED switch 110 so that the third switch Q3 be turned on. First capacitor C1 may be connected to the LED switch 110 in parallel to prevent chattering when the LED switch 110 is turning on and turning off. The resistance of the seventh resistor R7 and the capacitance of the second capacitor C2 may be determined by the delay time of the third switch. Since the delay time may be determined according to system requirements, the resistance of the seventh resistor R7 and the capacitance of the second capacitor C2 may be determined according to the system requirements as well.

Next, a case where the battery pack is operated in shut-down mode is described. When the LED switch 110 is controlled to be on based on a user input in shut-down mode, the first switch Q1 connected to the LED switch 110 is controlled to be on based on current from the LED switch 110. When the first switch Q1 is controlled to be on, the first switch Q1 outputs current to the second switch Q2 connected to the first switch Q1. The second switch Q2 is controlled to be on based on the current from first switch Q1.

When the second switch Q2 is controlled to be on, current from the second switch Q2, generated based on the supplied power VCC, is transmitted to the MCU 130. In one embodiment, the current output from the second switch Q2 is the inactive signal and, for example, may be the LED signal. The MCU 130 is also operated in shut-down mode when the battery pack is in shut-down mode, so that current transmitted to the MCU 130 does not influence the control operation of the battery pack.

In FIG. 2, current output when the first switch Q1 is controlled to be on is transmitted to the third switch Q3. In the exemplary embodiment, the third switch Q3 is an N-channel MOSFET, a drain D of the third switch Q3 may be connected to the second external connection terminal P−, a gate G of the third switch Q3 may be connected to the collector C of the first switch Q1, and a source of the third switch Q3 may be connected to the internal connection terminal B−. When current output from the first switch Q1 is received through the gate, the third switch Q3 may be controlled to be on and output the current to the source. In one embodiment, the third switch Q3 may be a predetermined switch device controlled to be on based on current generated from the first switch Q1 when the first switch Q1 is controlled to be on.

In shut-down mode of the battery pack, a potential of the second external connection terminal P− of the apparatus 100 may be different from a potential of the internal connection terminal B− of the battery pack. Accordingly, when the third switch Q3 is turned on, current flows from the second external connection terminal P− to the internal connection terminal B−. This current may serve as an active signal and may be an interrupt current, which is input into the internal connection terminal B−, to switch the power mode of the battery pack to wake-up mode.

In FIG. 2, the third switch Q3 is a low-side FET which forms a current path between the second external connection terminal P− and the internal connection terminal B− to control wake-up mode of the battery pack. In one embodiment, the third switch Q3 may be a high-side FET. In this case, a current path may be formed between the first external connection terminal P+ and a terminal B+ to control the wake-up mode of the battery pack.

In the various exemplary embodiments, a device (e.g., a rectification diode D1 along with a resistor R9) may be connected between the second external connection terminal P− and third switch Q3 to prevent current, flowing from the second external connection terminal P− to the internal connection terminal B−, from flowing backwards.

Figure 3:
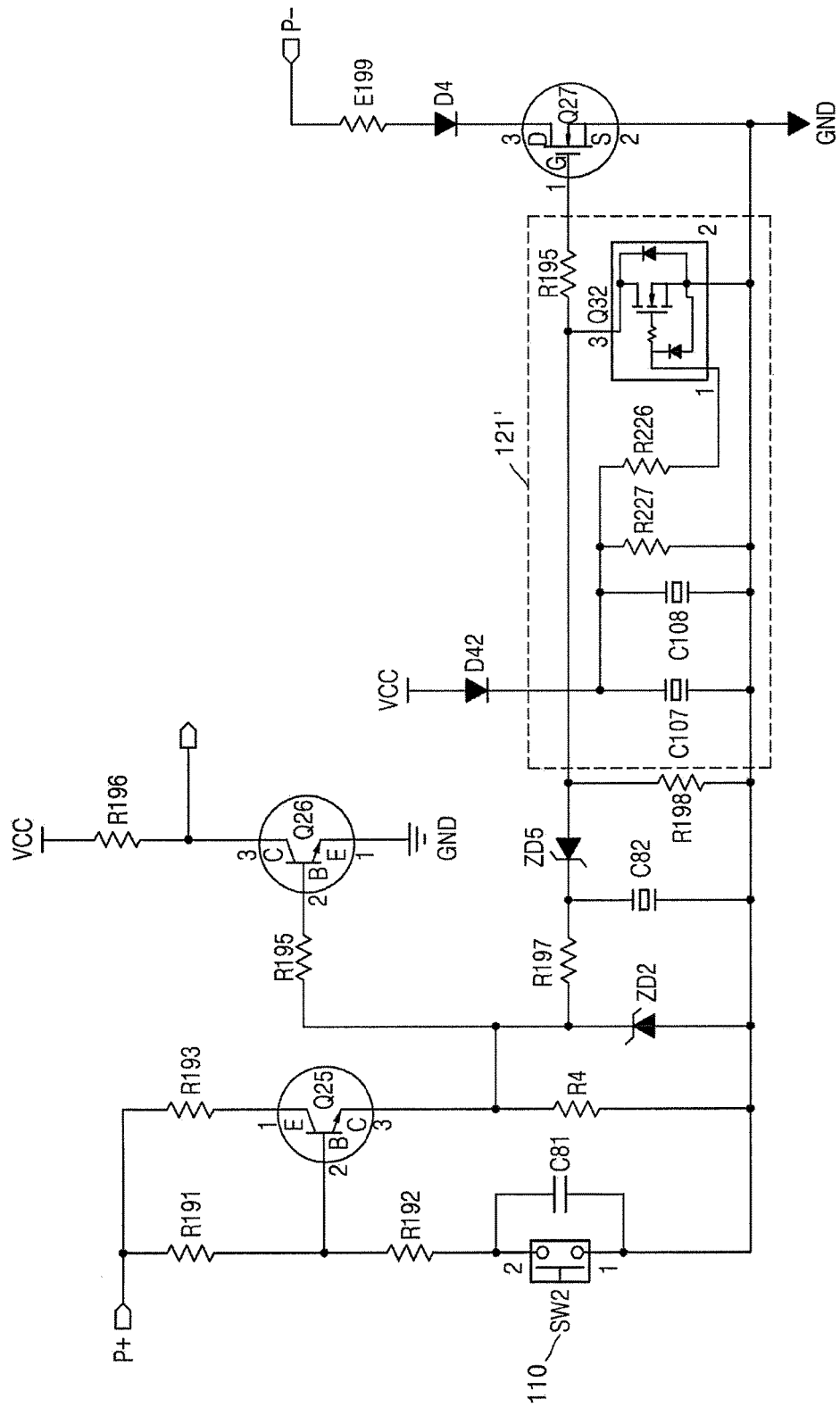
FIG. 3 illustrates another embodiment of an internal circuit of the apparatus.

FIG. 3 illustrates another embodiment of an internal circuit of the apparatus 100 for controlling the power mode of the battery pack. The first switch Q1, the second switch Q2, and the third switch Q3 in FIG. 2 may respectively correspond to switch Q25, switch Q26, and switch Q27 in FIG. 3. Operation of the circuit in FIG. 3 may be similar to operation of the circuit in FIG. 2.

Referring to FIG. 3, when the battery pack 100 is operated in wake-up mode, power VCC is supplied to the circuit, switch Q27 always maintains an off state by the switch Q32, which, for example, may be included in a control circuit 121'. Accordingly, a delay time to switch the power mode to wake-up mode after entrance into the shut-down mode may be determined based on time constants of one or more resistive elements, e.g., a resistor R226 (or resistor R227) and a capacitor C107 (or capacitor C108), of the control circuit 121'. Accordingly, the delay time during a mode switch is controlled based on a value of the one or more resistive elements in the control circuit 121'. As a result, it is possible to prevent the shut-down mode and the wake-up mode from being repeatedly switched. The control circuit 121' may prevent the switch Q27 from turning on when the battery pack 100 is on even if switch SW1 operates.

A second zener diode ZD2 and a fifth zener diode ZD5 may be connected to the switch Q27 to prevent over voltage applying to Gate-Source of the switch Q27. The second zener diode ZD2 may also be configured to apply constant voltage to resistor R197 and capacitor C82 so that the switch Q27 keep its operating time steady even if the voltage at the first external connection terminal P+ changes.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may, transform the computer, processor, controller, or other signal processing device into a special-purpose processor for performing the methods herein.

The controllers and other processing and control features of the embodiments disclosed herein may be implemented in logic which, for example, may include hardware, software, or both. When implemented at least partially in hardware, the controllers and other processing and control features may be, for example, any one of a variety of integrated circuits including but not limited to an application-specific integrated circuit, a field-programmable gate array, a combination of logic gates, a system-on-chip, a microprocessor, or other type of circuit.

When implemented in at least partially in software, the controllers and other processing and control features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, various changes in form and details may be made without departing from the spirit and scope of the embodiments set forth in the claims.

What is claimed is:

1. An apparatus for controlling a power mode of a battery pack, the apparatus comprising:
    an LED switch circuit to output a signal when the LED switch circuit is controlled to be on based on a user input; and
    a mode controller to control a power mode of the battery pack to be in a shut-down mode or a wake-up mode based on the signal from the LED switch circuit, wherein the mode controller includes:
        a first external connection terminal and a second external connection terminal to be directly connected to an external device;
        an internal connection terminal connected to an electronic device operated by the battery pack, wherein the battery pack is controlled to be in the wake-up mode when a third signal is output to the internal connection terminal;
        a first switch connected to the LED switch circuit and the first external connection terminal, the first switch to be controlled to be on based on the signal from the LED switch circuit and to output a first signal;
        a second switch connected to the first switch and controlled to output a second signal when controlled to be on based on the first signal; and
        a third switch connected to the first switch and controlled to output the third signal to the internal connection terminal when controlled to be on based on the first signal, which is received by the third switch.

2. The apparatus as claimed in claim 1, wherein the mode controller is to control the power mode of the battery pack when the signal is received for a time equal to a predetermined time.

3. The apparatus as claimed in claim 1, wherein:
    the first switch is a PNP transistor including an emitter, a collector, and a base, the emitter connected to the first external connection terminal and the base connected to the LED switch circuit, the first switch to output the first signal through the collector when the signal is received from the LED switch circuit through the base.

4. The apparatus as claimed in claim 3, wherein:
    the second switch is an NPN transistor including an emitter, a collector, and a base, the collector connected to supplied power and the base connected to the collector of the first switch, the second switch to output the second signal through the emitter when the first signal is received from the first switch through the base.

5. The apparatus as claimed in claim 4, wherein the second signal is an inactive signal to control the power mode of the battery pack to be the shut-down mode.

6. The apparatus as claimed in claim 3, wherein:
    the third switch is an N-channel MOSFET including a drain connected to the second external connection terminal, a gate connected to the collector of the first switch, and a source connected to the internal connection terminal, the third switch to output the third signal through the source when the first signal is received from the gate.

7. The apparatus as claimed in claim 6, wherein the third signal is an active signal to control the power mode of the battery pack to be the wake-up mode.

8. The apparatus as claimed in claim 6, further comprising:
    a rectification diode connected between the second external connection terminal and the third switch, the rectification diode to prevent a current, which flows from the second external connection terminal to the third switch, from flowing backward.

9. The apparatus as claimed in claim 6, further comprising:
    a control circuit connected between the first switch and the third switch,
    wherein the control circuit includes one or more resistive elements to prevent current from flowing to the internal connection terminal when the battery pack is in the wake-up mode.

10. The apparatus as claimed in claim 1, further comprising:
    a control circuit connected between the first switch and the third switch, wherein the control circuit includes a capacitor and a diode in parallel.

11. The apparatus as claimed in claim 1, wherein, during the wake-up mode, the third switch is maintained in an off state.

12. The apparatus as claimed in claim 1, further comprising a control circuit directly connected between the first switch and the third switch, wherein the control circuit includes a capacitor and a resistor connected in parallel.

13. The apparatus as claimed in claim 1, further comprising a capacitor connected in parallel with the LED switch.

* * * * *